United States Patent [19]

Smith et al.

[11] 4,046,733
[45] Sept. 6, 1977

[54] SULFONIC ACID COMPOSITION FOR FORMING THERMOPARTICULATING COATING

[75] Inventors: James D. B. Smith, Turtle Creek; David C. Phillips, Penn Hills, both of Pa.

[73] Assignee: Westinghouse Electric Corporation, Pittsburgh, Pa.

[21] Appl. No.: 645,164

[22] Filed: Dec. 30, 1975

[51] Int. Cl.$^2$ .................. C08K 5/01; C08L 63/00; G01K 13/02; G01N 31/00

[52] U.S. Cl. .................. 260/33.6 EP; 73/23; 260/2 EP; 260/2.5 EP; 260/32.8 EP; 260/33.2 EP; 260/33.4 EP; 260/37 EP; 260/294.8 R; 260/501.21; 260/505 C; 260/505 E

[58] Field of Search .......... 260/33.6 EP, 37 EP, 260/294.8 R, 501.21, 505 C, 505 E, 2 EP, 2.5 EP; 252/408 R

[56] References Cited

U.S. PATENT DOCUMENTS

| | | | |
|---|---|---|---|
| 2,687,397 | 8/1954 | Dannenberg | 260/834 |
| 2,909,497 | 8/1959 | Edelmann | 260/235 T |
| 3,427,880 | 2/1969 | Grobel et al. | 73/339 |
| 3,678,004 | 7/1972 | Meyers et al. | 260/47 EC |
| 3,705,117 | 12/1972 | Vargiu et al. | 260/2.5 B |
| 3,807,218 | 4/1974 | Carson et al. | 73/28 |

OTHER PUBLICATIONS

Hackh's Chemical Dictionary, (4th Ed.), (McGraw-Hill), (N.Y.), (1969), p. 58.

*Primary Examiner*—Donald E. Czaja
*Assistant Examiner*—H. H. Fletcher
*Attorney, Agent, or Firm*—R. D. Fuerle

[57] ABSTRACT

A composition is disclosed of a sulfonic acid or amine salt thereof, a resinous carrier, and a solvent. The composition is applied to a portion of an electrical apparatus which is exposed to a gas stream. The solvent in the composition is evaporated to produce a thermoparticulating coating. When the electrical apparatus overheats the sulfonic acid or amine sulfonate in the coating forms particles in the gas stream which are detected by a monitor.

16 Claims, No Drawings

SULFONIC ACID COMPOSITION FOR FORMING THERMOPARTICULATING COATING

CROSS-REFERENCES TO RELATED APPLICATIONS

This application is related to application Ser. No. 426,391 filed Dec. 19, 1973 by Emil M. Fort, Thomas D. Kaczmarek, and David Colin Phillips titled "Sampling System for Power Generators."

This application is related to application Ser. No. 390,284 filed Aug. 21, 1973 by J. D. B. Smith and D. C. Phillips titled "Malonic Acid Composition for Thermoparticulating Coating."

This application is related to application Ser. No. 568,219 filed Apr. 15, 1975, now U.S. Patent 3,995,489, by J. D. B. Smith and D. C. Phillips titled "Malonic Acid Derivative Composition for Forming Thermoparticulating Coating."

This application is related to application Ser. No. 568,224 filed Apr. 15, 1975 by J. D. B. Smith and D. C. Phillips now U.S. Pat. No. 3,979,353, titled "Diazonium Salt Composition for Forming Thermoparticulating Coating."

This application is also related to application Ser. No. 568,222 filed Apr. 15, 1975 by J. D. B. Smith, J. F. Meier, and D. C. Phillips titled "Block Isocyanate Composition for Forming Thermoparticulating Coating."

This application is related to application Ser. No. 568,223 filed Apr. 15, 1975, now U.S. Pat. No. 3,955,417, by J. D. B. Smith, D. C. Phillips and K. W. Grossett titled "Grease Thermoparticulating Coating."

This application is related to application Ser. No. 634,217 filed Nov. 21, 1975 by J. D. B. Smith, J. F. Meier and D. C. Phillips titled "Metal Dithiocarbamate Composition for Forming Thermoparticulating Coating."

PRIOR ART

U.S. Pat. No. 2,687,397 discloses the reaction of various amine sulfonates with epoxy resins. The amine sulfonates release amines which cure the epoxy resins.

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

As the cross-referenced related applications disclose, special coatings may be applied to the apparatus which decompose and form detectable particles at a lower temperature than the usual organic compounds found in the apparatus.

Efforts to identify materials which will decompose to form detectable particles (i.e., thermoparticulate) at temperature closer to the operating temperature of the machine have met with several difficulties. Many compounds, such as succinic acid, maleic acid, fumaric acid, and polyacrylic acid, do not decompose below 190° C. Others, such as acetic acid, are liquids which boil and therefore are unsuitable. Some compounds, such as oxalic acid and ketomalonic acid monohydrate decompose at a low temperature but the decomposition products do not include detectable particles. Compounds such as 1,2-diformylhydrazine have some of the desirable properties but cannot withstand several years' operation at 50° to 100° C. A few compounds contain toxic or corrosive substances in their decomposition products which may render them unsuitable.

SUMMARY OF THE INVENTION

We have found that sulfonic acids and amine salts thereof can be used in a composition to form a coating which thermoparticulates. The coating can be made compatible with the other organic compounds in the apparatus. The coating is very stable and can withstand several years operation at 60° C without decomposing, yet still produce detectable particles when the temperature reaches about 110° to 200° C (depending on the particular thermoparticulating compound used). Also, when the coating is heated to about the thermoparticulating temperature of the coating it blisters and becomes a very dark brown color which is a considerable aid in locating the malfunction. Unlike previously identified thermoparticulating compounds, some of the compounds of this invention can be aged for long periods at 80° to 100° C without losing thermoparticulation activity. Since some areas in generators normally operate at these temperatures, the compounds of this invention can be used where no other compounds could be. The compounds of this invention also give very strong signals when they thermoparticulate, which makes them very sensitive to overheating. Also, they are inexpensive and easily synthesized.

DESCRIPTION OF THE INVENTION

A composition is prepared of a sulfonic acid or amine salt thereof in a solution of a resinous carrier. The sulfonic acid may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed sulfonic acid of about 25 to about 1000 microns is suitable.

The composition may be prepared by simply mixing the ingredients, but it is preferable to mix the drier, resinous carrier, and solvent first and then add the sulfonic acid to prevent the occlusion of the drier in the sulfonic acid and thereby obtain a more homogeneous dispersion.

A suitable composition is a resinous carrier, about 20 to about 250 phr (parts by weight per hundred parts of resinous carrier) of a sulfonic acid or amine salt thereof, and about 25 to about 75% (by weight based on the resinous carrier) of a solvent for the resinous carrier. If the amount of sulfonic acid is less than about 20 phr, the quantity of particles given off during decomposition may be too low to be detected by presently-existing detectors. However, the construction of more sensitive detectors would permit a lower amount of sulfonic acid. If the amount of sulfonic acid exceeds about 250 phr, the composition is thick, difficult to apply, and does not bond well. The preferred amount of sulfonic acid, which generally gives the best results, is about 40 to about 60 phr. If the amount of solvent is less than about 25% (by weight based on the resinous carrier), the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc., could also be used. Resins such as polyesters may also require the presence of an organic peroxide as is known in the art. Mixtures of various resins, solvents, or driers are also contemplated.

The thermoparticulating compounds of this invention are sulfonic acids and amine salts thereof. Preferred sulfonic acids are those having the general formula

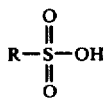

where R is aryl or conjugated heterocyclic, because these compounds tend to be more stable and to thermoparticulate at lower temperatures.

Amine salts of sulfonic acids have the group

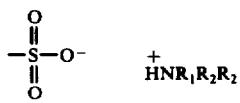

where $R_1$ is alkyl to $C_{20}$, aryl, alkylaryl to $C_{20}$, heterocyclic or aliphatic. Each $R_2$ is independently selected from hydrogen and $R_1$. Examples include benzene sulfonic acid:

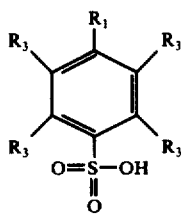

where each $R_3$ is independently selected from $R_1$, nitro, and halogen. Another example is 3-pyridine sulfonic acid:

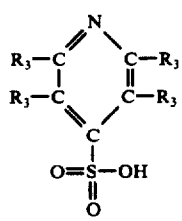

Still another example is 1-naphthalene sulfonic acid:

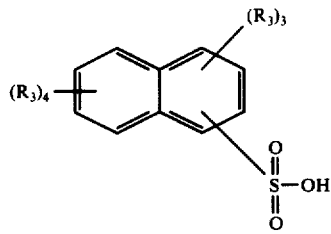

where $R_3$ was previously defined. Amine salts of the above acids may also be used, as previously defined. Mixtures of acids and their amine salts and mixtures of various acids and/or amine salts are also contemplated.

Amine salts are preferred as they are more stable on aging than the sulfonic acids. Generally, pyridine sulfonic acids and naphthalene sulfonic acids and their amine salts are preferred because their thermoparticulation products are easily identified by mass spectrograph. Toluene sulfonic acids and their amine salts are also preferred because they are readily available, are less expensive, and have lower thermoparticulating temperatures.

In particular, p-toluene sulfonic acid, benzene sulfonic acid, and 1-naphthalene sulfonic acid are the preferred sulfonic acids because they thermoparticulate at lower temperatures. For the same reason the preferred amine salts are pyridinium benzenesulfonate, pyridinium p-toluene sulfonate, N,N-dimethylanilinium p-toluene sulfonate and benzyldimethylamino p-toluene sulfonate.

The resinous carrier performs the function of bonding the sulfonic acid to the apparatus since a coating of sulfonic acid by itself does not adhere well. The resinous carrier should be compatible with the other resins used in the apparatus and therefore it is usually advantageous to use the same resin used elsewhere. The resinous carrier is curable at room temperature and is preferably air-dryable since it cannot be easily cured in place with heat. Also, it should be stable after curing for several years at 60° C. The resin must be unreactive with the sulfonic acid for otherwise suitable thermoparticulation may not occur. The sulfonic acid and the resin form a mixture and the sulfonic acid does not catalyze the cure of the resin. Epoxy resins are preferred as they are usually used elsewhere in the apparatus, but polyesters, silicone rubber, styrene, acrylics, urethanes, etc., could also be used.

The solvent for the resinous carrier depends on the particular resinous carrier used. Toluene, xylene, benzene, methyl ethyl ketone, ethyl alcohol, diethyl ether, acetone, cellosolve, etc., are common solvents that may be used. Toluene is preferred as it is inexpensive and dissolves most resins. A reactive diluent such as butyl glycidyl ether may also be used as a solvent with some resins.

The composition is applied to portions of the electrical apparatus which are exposed to the gas steam. The coating does not function as insulation and is usually applied on top of insulation, but it can also be applied to conductors. The application may be made by painting, spraying, dipping, grease gun, or other techniques. A suitable coating thickness (after drying) is about 1/16 to about ⅛ inch. The dispersed particles of sulfonic acid should not be covered with excessive resinous carrier as that may prevent the decomposition particles from escaping into the gas stream. After evaporation of the solvent and room temperature cure of the resinous carrier, if necessary, the apparatus is ready to be operated. When the thermoparticulation and the resulting alarm occur, a sample of the gas stream can be collected and analyzed. Since different thermoparticulating compounds can be used in different areas of the apparatus and their thermoparticulation products are different, analysis of the sample can pinpoint the location of the overheating.

The compositions of this invention, particularly those that are stable at high temperatures, are useful in areas of generators which are subject to temperatures of about 80° to 100° C. Such areas include the outside surface of the stator windings of a 2-pole, inner-cooled stator at the turbine end (i.e., at the "hot" end) on the outside surface of the stator windings in a 4-pole water-cooled stator at the turbine end (i.e., the "hot" end) and at the "hot" end of a stator core.

The following example further illustrates this invention:

EXAMPLE 1

The following composition was prepared using sulfonic acid or various amine sulfonates:

|  | Parts by Weight |
|---|---|
| Sulfonic acid or amine salt | 100 |
| Epoxy resin 50% solids in toluene made from 200 pbw (parts by weight) linseed fatty acids, 200 pbw styrene, and 300 pbw diglycidyl ether of Bisphenol A, sold by Westinghouse Electric Corporation as "B-276" Varnish (See Example I of U.S. Patent 2,909,497 for detailed description) | 100 |
| 6% solution in low boiling hydrocarbons of cobalt naphthenate | 1.0 |
| 24% solution in low boiling hydrocarbons of lead naphthenate | 0.25 |

The cobalt and lead naphthenate solutions were added to the epoxy resin prior to the addition of the sulfonic acid or amine salt.

Samples were prepared by brushing the above composition onto 3-inch by 1-inch aluminum and copper sheets 1/16 to ⅛ inches thick. The samples were dried to form coatings about ¼ inches thick, then placed in an oven at 60°, 80° and 100° C for various periods to determine if they were stable and would function after aging.

The samples were placed one at a time in a stainless steel boat within a 1-inch stainless steel tube. Hydrogen was passed over the samples at a flow rate of 7 l/min. A phase-controlled temperature regulator and programmer controlled the temperature in the boat and the temperature in the boat was measured by mounting a hot junction chromel-alumel thermocouple within a small hole in the boat. The output of the thermocouple and the detector were monitored on a two-pen potentiostatic recorder. A 6° C/min. heating rate was maintained in each experiment after the insertion of the sample in the boat. The threshold temperature at which considerable particulation occurred was taken from the chart produced by the recorder. The occurrence of particulation was detected using a Generator Condition Monitor or a Condensation Nuclei Monitor. Both instruments are sold by Environment One Corporation.

The following table gives the results for compounds aged overnight at 60° C.

| Sulfonic Acid or Amine Salt | Organo-Particulation Temperature Range (° C) | Melting Point (° C) |
|---|---|---|
| p-toluene sulfonic acid | 115–119 | 103–106 |
| benzene sulfonic acid | 113–119 | 44–50 |
| 3-pyridine sulfonic acid | 177–187 | 300 |
| 1-naphthalene sulfonic acid | 124–129 | 77–79 |
| pyridinium benzene sulfonate | 151–154 | 132–134 |
| morpholinium benzene sulfonate | 184–181 | 110–112 |
| n-butylamino benzene sulfonate | 187–189 | 108–110 |
| morpholium 3-pyridine sulfonate | 200 | 230 |
| n-butylamino 3-pyridine sulfonate | 200 | 250 |
| morpholinium 1-naphthalene sulfonate | *190 | 193–196 |
| n-butylamino 1-naphthalene sulfonate | *190 | 252–254 |

Weak signal obtained, which was not strong enough to produce a 50% drop in ion chamber current.

The first number in the organoparticulation range is the temperature of the sample when the alarm sounded on the ion chamber monitor. The second number in the organoparticulation range is the temperature of the sample when the current in the ion chamber had dropped to about half its normal value (i.e., from about 0.8mA to about 0.4mA).

The amine salts used in the above table and in the following table were prepared by neutralizing the sulfonic acid with an amine. Details of the procedure may be found in U.S. Pat. No. 2,687,397, except that the pyridine sulfonic acid salts were prepared in aqueous solutions because they are insoluble in other common solvents. The following table gives the results of similar tests on p-toluene sulfonic acid and many of its amine salts.

| Amine | % Yield of Product | Melting Point (° C) | Aging Conditions | Organo-Particulation Temperature Range (° C) |
|---|---|---|---|---|
| None | ~ | ~ | 3 days at 60° C in air | 115–119 |
|  |  |  | 4 mo. at 80° C in N₂ | 128–135 |
|  |  |  | 4½ mo. at 100° C in air | 170–179 |
| benzyldimethylamine | 69.0 | 185–188 | 3 days at 60° C in air | 164–167 |
|  |  |  | 4 mo. at 80° C in N₂ | 172–175 |
| n-propylamine | 58.1 | 140–143 | 3 days at 60° C in air | 171–174 |
|  |  |  | 2½ mo. at 100° C in N₂ | 167–175 |
| pyridine | 29.4 | 115–120 | 3 days at 60° C in air | 153–158 |
|  |  |  | 2 mo. at 80° C in air | 131–136 |
|  |  |  | 2½ mo. at 100° C in N₂ | 141–147 |
| 1-methylimidazole | 6.8 | 92–95 | 3 days at 60° C in air | 175–177 |
|  |  |  | 6½ mo. at 60° C in air | 171–174 |

| Amine | % Yield of Product | Melting Point (° C) | Aging Conditions | Organo-Particulation Temperature Range (° C) |
|---|---|---|---|---|
| | | | 2 mo. at 80° C in air | 170–173 |
| t-butylamine | 64.2 | 223–226 | 3 days at 60° C in air | 176–178 |
| | | | 6¼ mo. at 60° C in air | 173–176 |
| | | | 2 mo. at 80° C in air | 172–178 |
| | | | 2½ mo. at 100° C in N₂ | 178–183 |
| n-butylamine | 46.5 | 122–125 | 3 days at 60° C in air | 176–178 |
| | | | 6¼ mo. at 60° C in air | 167–170 |
| | | | 2 mo. at 80° C in air | 175–179 |
| | | | 2½ mo. at 100° C in N₂ | 173–179 |
| morpholine | 29.0 | 124–126 | 16 days at 80° C in air | 165–170 |
| N,N-dimethylaniline | 6.5 | 95–98 | 3 days at 60° C in air | 142–145 |

The following table gives the results of similar experiments performed using commercial sulfonates:

| Sulfonate | Aging Conditions | Organo-Particulation Temperature Range (° C) |
|---|---|---|
| trimethyl phenyl benzene sulfonate | days at 60° C in air | 202 |
| tetraethyl ammonium p-toluene sulfonate | 3 days at 60° C in air | 196 |
| 3-pyridine sulfonic acid | 1 day at 60° C in air | 177–187 |
| | 4½ mo. at 100° C in air | 182–186 |

In the above tables the compounds which thermoparticulated at temperatures in excess of 200° C are probably not useful for applications in most generators. However, it is believed that other members of the same chemical family may thermoparticulate at lower temperatures.

EXAMPLE 2

A composition was prepared as in Example 1 which contained morpholine p-toluenesulfonate. The composition was brushed onto a copper rectangular block (4 × 2¼ × 1½ inches). The coating was allowed to dry overnight at 80°–85° C; total coating build was approximately 10 mils over an area of 31 square inches (end plates not covered). The block contained two 650-watt heaters drilled into the copper core; the heaters were connected in parallel (two exit leads) and the block was equipped with two thermocouples. The block was connected to an inspection plate in a generator (four sides of the block in hydrogen flow); the block was approximately ¼ inch from the outer surface of the generator.

In the test, the coated block was externally heated by a source of electrical power. The rate of rise of temperature was controlled to 5° C/minute and the hydrogen was monitored for particulate matter by means of an Environment One Generator Condition Monitor (connected to the generator in the standard manner described in the monitor manual).

The following results were obtained:

| Alarm Temperature (° C) | Time of Run (Minutes) | Monitor Flow (Meter Reading) | Pressure (psi) | Speed (rpm) | Gas Temperature (° C) |
|---|---|---|---|---|---|
| 165–175 | 15 | 11.0 | 30 | 3600 | 31 |

What is claimed is:
1. A composition comprising
   1. a thermoparticulating compound selected from the group consisting of sulfonic acids, amine salts of sulfonic acids, and mixtures thereof; and
   2. a solution of a resinous carrier curable at room temperature, stable at 60° C, and unreactive with said thermoparticulating compound.
2. A composition according to claim 1 wherein said thermoparticulating compound is selected from the group consisting of compounds having the general formula

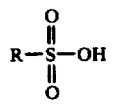

amine salts thereof, and mixtures thereof, where R is aryl or conjugated heterocyclic.

3. A composition according to claim 2 wherein said thermoparticulating compound is selected from the group consisting of toluene sulfonic acid, 3-pyridine sulfonic acids, naphthalene sulfonic acids, amine salts thereof, and mixtures thereof.

4. A composition according to claim 1 wherein said thermoparticulating compound is an amine salt of a sulfonic acid.

5. A composition according to claim 4 wherein said amine salt is selected from the group consisting of pyridinium benzenesulfonate, pyridinium p-toluene sulfonate, N,N-dimethylanilinium p-toluene sulfonate, benzyldimethylamino p-toluene sulfonate, and mixtures thereof.

6. A composition according to claim 1 wherein said thermoparticulating compound is selected from the group consisting of p-toluene sulfonic acid, benzene sulfonic acid, 1-naphthalene sulfonic acid, and mixtures thereof.

7. A composition according to claim 1 wherein the amount of said thermoparticulating compound is about 20 to about 250 phr and the amount of the solvent in said solution is about 25 to about 75% (by weight based on said resinous carrier).

8. A composition according to claim 7 wherein the amount of said thermoparticulating compound is about 40 to about 60 phr and the amount of said solvent is about 45 to about 55% (by weight based on said resinous carrier).

9. A composition according to claim 1 wherein said resinous carrier is an epoxy resin.

10. A composition according to claim 9 which includes about 0.1 to about 3 phr of a drier for said epoxy resin.

11. A composition according to claim 10 which is prepared by first mixing said solution of resinous carrier and said drier and then mixing in said thermoparticulating compound.

12. A composition according to claim 1 where the solvent in said solution is toluene.

13. A composition according to claim 1 wherein said thermoparticulating compound is dispersed in said solution.

14. A thermoparticulating coating comprising a solid layer of a cured resinous carrier containing an unreacted compound selected from the group consisting of sulfonic acids, their amine salts, and mixtures thereof.

15. A coating according to claim 14 which is about 1/16 to about ½ inches thick.

16. A composition according to claim 1 wherein said resinous carrier is air-dryable.

* * * * *